(12) United States Patent
Ranucci et al.

(10) Patent No.: US 6,430,835 B1
(45) Date of Patent: Aug. 13, 2002

(54) SETTING FIXTURE FOR DOOR MEASUREMENT

(75) Inventors: Costantino R Ranucci, Clinton Township; Ronald D Papke, Shelby Township; Hasan H Ramouni; Awad Ramouni, both of Dearborn, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/561,087

(22) Filed: Apr. 28, 2000

(51) Int. Cl.$^7$ ................................................ G01D 21/00
(52) U.S. Cl. .......................... 33/645; 33/600; 33/608; 33/613
(58) Field of Search ............................. 33/645, DIG. 1, 33/533, 600, 608, 613

(56) References Cited

U.S. PATENT DOCUMENTS

| | | | |
|---|---|---|---|
| 3,981,587 A | 9/1976 | Gievers | |
| 4,015,338 A | 4/1977 | Kunze et al. | |
| 4,815,215 A * | 3/1989 | Saylor et al. | 33/613 |
| 5,299,609 A * | 4/1994 | Wedler | 33/613 |
| 5,557,829 A | 9/1996 | Schoen et al. | |
| 5,577,295 A | 11/1996 | Papke et al. | |
| 5,737,073 A * | 4/1998 | Wente et al. | 33/288 |
| 5,740,598 A | 4/1998 | Sauve | |
| 5,829,146 A * | 11/1998 | Watson | 33/288 |
| 5,924,170 A | 7/1999 | Papke et al. | |
| 6,101,706 A * | 8/2000 | Roy | 33/645 |
| 6,122,809 A * | 9/2000 | Roy | 33/600 |
| 6,122,813 A * | 9/2000 | Roy et al. | 33/645 |
| 6,122,819 A * | 9/2000 | Roy et al. | 33/600 |
| 6,138,337 A * | 10/2000 | Lezuch et al. | 33/600 |
| 6,311,382 B1 * | 11/2001 | Jack | 33/600 |
| 6,349,480 B1 * | 2/2002 | Baulier et al. | 33/194 |

* cited by examiner

Primary Examiner—Diego Gutierrez
Assistant Examiner—Yaritza Guadalupe
(74) Attorney, Agent, or Firm—Ralph E. Smith

(57) ABSTRACT

A positioning device for positioning a first member in a desired radial orientation relative to a second member. The positioning device includes a coupling portion for coupling the positioning device to the second member, a contact member for contacting the first member and an adjustment portion for controllably adjusting the distance between the contact member and the coupling portion. The radial orientation of the first member relative to the second member is changed by adjusting the distance between the contact member and the coupling portion. A method for taking dimensional data on a hinged subassembly is also provided.

6 Claims, 2 Drawing Sheets

SETTING FIXTURE FOR DOOR MEASUREMENT

FIELD OF THE INVENTION

The present invention relates generally to positioning fixtures, and more particularly to a positioning fixture and a method for using a positioning fixture to adjust the portion of the body side of a hinge assembly relative to a door assembly.

BACKGROUND

In the automotive industry, the fit and finish of a new vehicle plays an important role in the customer's overall satisfaction with the vehicle. The term "fit" refers to the manner in which various vehicle components are aligned to the vehicle body. These components include, for example, the doors, the hood and the trunk. Fit is said to be poor when the surfaces of these various vehicle components do not lie in the same plane as the body. This aspect of "fit" is includes instances where vehicle components protrude from or are recessed relative to adjacent portions of the vehicle. Fit is also said to be poor when these vehicle components are shifted or skewed relative to the vehicle body. This aspect of "fit" is usually manifested by gaps between the vehicle component and the vehicle body that are of an inconsistent magnitude.

When the fit of a vehicle is good and even, the vehicle owner is likely to be influenced as to the quality of the vehicle in a positive manner. Conversely, when the fit is not good and even, the owner is more likely to complain to the vehicle dealer and attribute a lack of quality to the vehicle generally. Accordingly, vehicle manufacturers are extremely concerned with the fit of their vehicles and are actively seeking improvements in their manufacturing processes that will permit the fit of a vehicle to be precisely controlled and maintained.

An important step in developing effective strategies for controlling fit is the measurement of various sub-assemblies prior to their installation to the vehicle body. This step is important in that it documents the cumulative effect of variations within a process and between components. To provide meaningful dimensional data on the subassembly, the subassembly must be measured in a position identical to the position it would be in if it were mounted to the vehicle. This requirement presents a substantial challenge when data on hinged subassemblies, such as vehicle doors, is needed.

Typically, hinged subassemblies include a hinge assembly having a hinge pin that pivotably couples two hinge leaves. In these hinged subassemblies, a first hinge leaf is fixedly coupled to the door structure and a second hinge leaf is left free to rotate about the hinge pin. With these subassemblies, it is necessary to orient the second (free) hinge leaf into a position that is representative of the position that the second leaf would be in if the door assembly were coupled to the vehicle body.

SUMMARY OF THE INVENTION

Accordingly, it is one aspect of the present invention to provide a positioning tool for positioning a hinged subassembly in a manner that permits the dimensional relationship of the subassembly to be documented.

It is a more specific aspect of the present invention to provide a positioning tool for positioning a member of a hinged subassembly in a desired position in a reliable and accurate manner.

It is another aspect of the present invention to provide a method for taking dimensional data on a hinged subassembly.

In one form, the present invention provides a positioning device for positioning a first member in a desired radial orientation relative to a second member. The positioning device includes a coupling portion for coupling the positioning device to the second member, a contact member for contacting the first member and an adjustment portion for controllably adjusting the distance between the contact member and the coupling portion. The radial orientation of the first member relative to the second member is changed by adjusting the distance between the contact member and the coupling portion. A method for taking dimensional data on a hinged subassembly is also provided.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
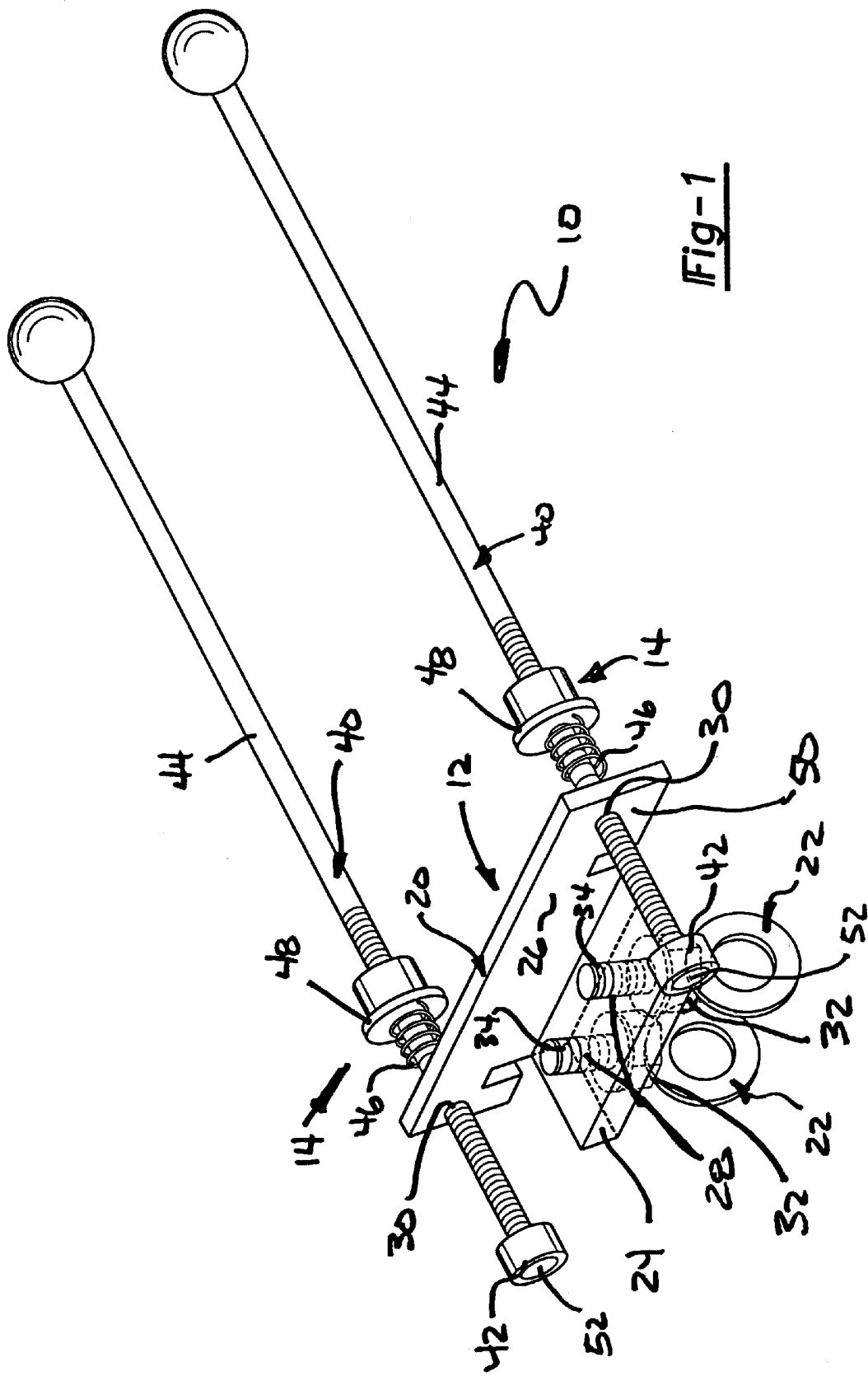
FIG. 1 is a perspective view of a positioning tool constructed in accordance with the teachings of the present invention.

With reference to FIG. 1 of the drawings, a positioning tool constructed in accordance with the teachings of the present invention is generally indicated by reference numeral 10. Positioning tool 10 is shown to include a clamping portion 12 and a pair of spacing mechanisms 14.

Clamping portion 12 is shown to include a bracket 20 and a pair of threaded members 22. Bracket 20 is generally L-shaped and includes a clamp portion 24 formed in the leg of the bracket 20 and an adjustment portion 26 formed in the base of the bracket 20. Clamp portion 24 includes a pair of first threaded apertures 28 which extend through clamp portion 24 normal to adjustment portion 26. Similarly, adjustment portion 26 includes a pair of second threaded apertures 30 which extend through adjustment portion 26 normal to clamp portion 24. Each threaded member 22 has a head portion 32 and an externally threaded body portion 34 which is adapted to threadably engage one of the first threaded apertures 28. Threaded members 22 are removable from bracket 20 for purposes that will be discussed in detail, below.

Each spacing mechanism 14 is shown to include an adjustment assembly 40 and a contactor 42. Adjustment assembly 40 includes an externally threaded adjustment member 44, a spring member 46 and a flange 48. Externally threaded adjustment member 44 is sized to threadably engage one of the second threaded apertures 30 of the adjustment portion 26. Contactor 42 is coupled to an end of externally threaded adjustment member 44 and is positioned on a first side 50 of bracket 20. In the particular embodiment illustrated, contactor includes a magnet 52. Flange 48 is coupled to externally threaded adjustment member 44 and extends radially outward therefrom. Flange 48 is positioned on a side of bracket 20 opposite the first side 50. Spring member 46 is disposed between flange 48 and bracket 20 and exerts a force onto the flange which inhibits the externally threaded adjustment member 44 from rotating freely in the second threaded aperture 30.

Figure 2:
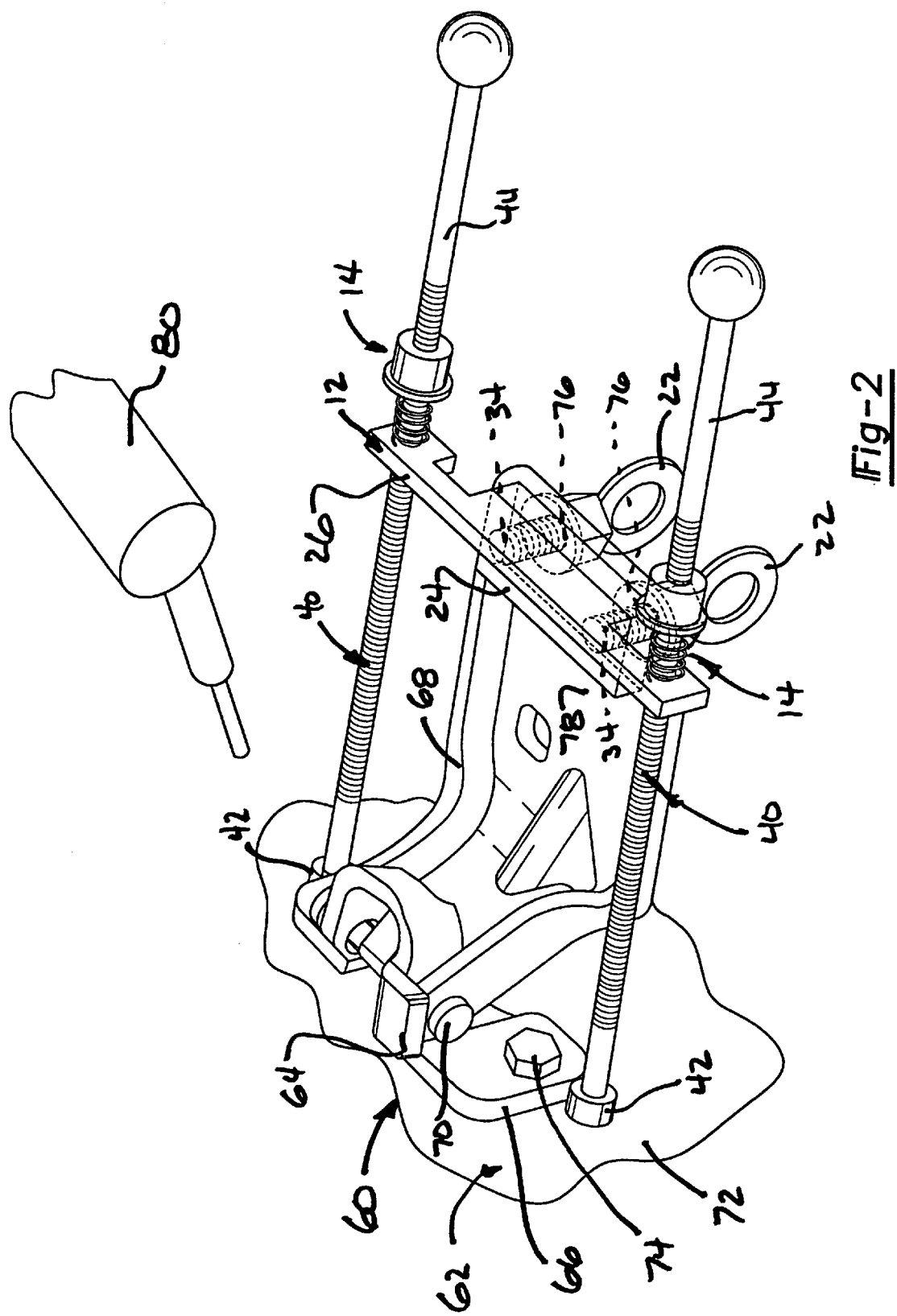
FIG. 2 is a perspective view of the tool of FIG. 1 in operative association with a door assembly.

In FIG. 2, positioning tool 10 is shown in operative association with a hinged subassembly 60. In the example illustrated, hinged subassembly 60 includes a door assembly 62 and a hinge assembly 64. Door assembly 62 and hinge assembly 64 are conventional in construction and need not be discussed in detail. Briefly, hinge assembly 64 includes a first leaf member 66 which is pivotably coupled to a second leaf member 68 via a hinge pin 70. First leaf member 66 is fastened to the inner panel 72 of door assembly 62 via a pair of conventional fasteners 74. Second leaf member 68 includes a pair of mounting apertures 76 which are adapted to receive a pair of conventional fasteners to fasten second leaf member 68 to a vehicle body (not shown).

Positioning tool 10 is initially prepared for use by removing the threaded members 22 from the bracket 20. Bracket 20 is placed over a first side 78 of second leaf member 68, threaded members 22 are inserted through the mounting apertures 76 and rotated to threadably engage the first threaded apertures 28 and create a clamping force which fixedly but removably couples second leaf member 68 to clamping portion 12. Externally threaded adjustment members 44 are next rotated to bring contactors 42 into contact with inner panel 72. The magnet 52 in each of the contactors 42 ensures that spacing mechanisms 14 will contact inner panel 72 and remain in contact with it.

A gage, such as an indicator or a coordinate measuring machine (CMM) 80, is next used to determine the radial position of second leaf member 68 relative to door assembly 62. If second leaf member 68 is not in the desired radial position (e.g., the position the second leaf member 68 would be in if the hinged subassembly 60 was fastened to a vehicle body), data from the CMM 80 is used to alter the length of the spacing mechanisms 14 to change the angle between the second leaf member 68 and the door assembly 62. In the particular embodiment illustrated, the angle between the second leaf member 68 and the door assembly 62 is changed by rotating the externally threaded adjustment member 44. Once the second leaf member 68 is positioned in the desired radial position, the CMM 80 is employed to take dimensional data on the hinged subassembly 60.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning device for positioning a door assembly member relative to a hinge member, the door assembly and hinge members being pivotably coupled to one another, the positioning device comprising:
   coupling means for coupling the positioning device to the hinge member;
   a contact member adapted to contact an inner panel of the door assembly member; and
   adjustment means for controllably adjusting a distance between the contact member and the coupling means;
   wherein the distance between the contact member and the coupling means is adjusted to position the hinge member in a predetermined radial position relative to the door assembly member.

2. The positioning device of claim 1, wherein the contact member includes a magnet adapted for removably coupling the adjustment means to the door assembly member.

3. The positioning device of claim 1, wherein the adjustment means includes an externally threaded adjustment member coupled to the contact member at a first end and threadably engaging the coupling means.

4. The positioning device of claim 1, wherein the coupling means includes a bracket structure and a threaded member having a head portion and an externally threaded body portion, the externally threaded body portion threadably engaging a threaded aperture in the bracket structure, the bracket structure and the threaded member adapted to cooperate to exert a clamping force onto the hinge member to couple the hinge member to the coupling means.

5. A positioning device for positioning a first member relative to a second member, the first and second members being pivotably coupled to one another, the positioning device comprising:
   coupling means for coupling the positioning device to the second member;
   a contact member adapted to contact the first member; and
   adjustment means for controllably adjusting a distance between the contact member and the coupling means, wherein the distance between the contact member and the coupling means is adjusted to position the second member in a predetermined radial position relative to the first member, and the adjustment means further includes a spring member and a flange, the flange coupled to the externally threaded adjustment member and positioned on a side of the coupling means opposite the contact member, the spring disposed between the flange and the coupling means and exerting a force onto the flange which inhibits the externally threaded adjustment member from rotating freely.

6. A positioning device for positioning a first member relative to a second member, the first and second members being pivotably coupled to one another, the positioning device comprising:
   a bracket having clamping portion and an adjustment portion, the clamping portion having a first threaded aperture and the adjustment portion having a second threaded aperture;
   a threaded member having a head portion and an externally threaded body portion, the externally threaded body portion threadably engaging the first threaded aperture of the clamping portion, the first threaded member being adapted to cooperate with the clamping portion to exert a clamping force onto the second member to couple the second member to the bracket; and
   a spacing mechanism having an adjustment assembly and a contactor, the adjustment assembly including an externally threaded adjustment member, a spring and a flange, the externally threaded adjustment member threadably engaging the second threaded aperture of the adjustment portion, the contactor coupled to an end of the externally threaded adjustment member and positioned on a first side of the bracket, the contactor having a magnet adapted to removably couple the spacing mechanism to the first member, the flange coupled to the externally threaded adjustment member and positioned on a side opposite the first side of the bracket, the spring disposed between the flange and the bracket and exerting a force onto the flange which inhibits the externally threaded adjustment member from rotating freely in the second threaded aperture;
   wherein rotation of the externally threaded adjustment member is adapted to adjust the second member to a predetermined radial position relative to the first member.

* * * * *